(12) United States Patent
Lee et al.

(10) Patent No.: US 12,553,069 B2
(45) Date of Patent: Feb. 17, 2026

(54) ISOPROPYLMALATE SYNTHASE POLYPEPTIDE VARIANT AND A METHOD FOR PRODUCING L-LEUCINE USING THE SAME

(71) Applicant: CJ CheilJedang Corporation, Seoul (KR)

(72) Inventors: Hayun Lee, Seoul (KR); Ju Eun Kim, Seoul (KR); Jihyun Shim, Seoul (KR); Ji Hye Lee, Seoul (KR); Sung Gun Lee, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 432 days.

(21) Appl. No.: 17/760,462

(22) PCT Filed: May 13, 2021

(86) PCT No.: PCT/KR2021/006033
§ 371 (c)(1),
(2) Date: Aug. 10, 2022

(87) PCT Pub. No.: WO2021/235775
PCT Pub. Date: Nov. 25, 2021

(65) Prior Publication Data
US 2023/0088135 A1    Mar. 23, 2023

(30) Foreign Application Priority Data
May 20, 2020    (KR) .................. 10-2020-0060578

(51) Int. Cl.
*C12P 13/06* (2006.01)
*C12N 9/10* (2006.01)
*C12N 15/77* (2006.01)

(52) U.S. Cl.
CPC ............ *C12P 13/06* (2013.01); *C12N 9/1025* (2013.01); *C12N 15/77* (2013.01); *C12Y 203/03013* (2013.01); *C12N 2800/101* (2013.01)

(58) Field of Classification Search
None
See application file for complete search history.

(56) References Cited

U.S. PATENT DOCUMENTS

| | | | |
|---|---|---|---|
| 6,403,342 | B1 | 6/2002 | Gusyatiner et al. |
| 7,332,310 | B2 * | 2/2008 | Nakagawa ..... C12Y 604/01001 435/252.32 |
| 10,385,367 | B2 * | 8/2019 | Way .......................... C12P 7/42 |
| 2018/0251772 | A1 | 9/2018 | Song et al. |
| 2020/0032305 | A1 | 1/2020 | Lee et al. |

FOREIGN PATENT DOCUMENTS

| | | |
|---|---|---|
| CN | 106754807 | 5/2017 |
| CN | 108884449 | 11/2018 |
| CN | 109456987 | 3/2019 |
| CN | 110540976 | 12/2019 |
| CN | 110551670 | 12/2019 |
| JP | 2015-514431 | 5/2015 |
| JP | 2020-503045 | 1/2020 |
| KR | 10-1796830 | 11/2017 |
| KR | 10-2018-0077008 | 7/2018 |
| KR | 10-2094875 | 3/2020 |
| RU | 2201454 | 3/2003 |
| RU | 2693663 | 7/2019 |
| WO | 2018124440 | 7/2018 |

OTHER PUBLICATIONS

KIPO, a PCT Search Report & Written Opinion of PCT/KR2021/006033 dated Aug. 12, 2021.
Yuechao Ma et al., "Comparative genomic and genetic functional analysis of industrial L-leucine- and L-valine-producing Corynebacterium glutamicum strains", Journal of Microbiology and Biotechnology, 2018, pp. 1916-1927, Sep. 20, 2018.
Gunter B. Kohlhaw, "Isopropylmalate Dehydratase from Yeast", Methods in Enzymology 166:423-9 (1988).
Sambrook et al., Molecular Cloning: A Laboratory Manual, 3rd Ed.,Cold Spring Harbor Laboratory Press, Cold Spring Harbor, N.Y. (2001)).
EPO, search report of EP 21809542.0 dated Apr. 17, 2024.
Michael Vogt et al., "Pushing product formation to its limit: metabolic engineering of Corynebacterium glutamicum for L-leucine overproduction", Metabolic Engineering, vol. 22, Mar. 1, 2014, pp. 40-52.
SIPO, Office Action of CN 202180027726.2 dated Aug. 20, 2024.
JPO, Notice of Allowance of JP 2022-562152 dated Sep. 30, 2024.
NCBI Reference Sequence: WP_015439406.1, May 19, 2013, "2-isopropylmalate synthase [Corynebacterium glutamicum]", found online at https://www.ncbi.nlm.nih.gov/protein/WP_015439406.1?report=genbank&log$=prottop&blast_rank=1&RID=8C3M29DD013, Jun. 13, 2023.
James C. Whisstock et al., "Prediction of proteinfunction fromprotein sequence and structure", Quarterly reviews of biophysics 36.3 (2003): 307-340, Aug. 2003.
Andrzej Witkowski et al., "Conversion of a β-ketoacyl synthase to a malonyl decarboxylase by replacement of the active-site cysteine with glutamine", Biochemistry 38.36 (1999): 11643-11650, Aug. 18, 1999.

(Continued)

*Primary Examiner* — Hope A Robinson
(74) *Attorney, Agent, or Firm* — Morgan, Lewis & Bockius LLP

(57) ABSTRACT

The present application relates to: a novel mutant polypeptide having isopropylmalate synthase activity; and a method for producing L-leucine by using same. L-leucine can be produced at high yield by using the mutant polypeptide according to an embodiment.

13 Claims, No Drawings
Specification includes a Sequence Listing.

(56) References Cited

OTHER PUBLICATIONS

Pierre Broun et al., "Catalytic Plasticity of Fatty Acid Modification Enzymes Underlying Chemical Diversity of Plant Lipids", Science 282.5392 (1998): 1315-1317, Nov. 13, 1998.
Rospatent, Office Action of the corresponding Russian Patent Application No. 2022122595, dated Jun. 14, 2023.
Rospatent, Search Report of the corresponding Russian Patent Application No. 2022122595, dated Jun. 14, 2023.

\* cited by examiner

ISOPROPYLMALATE SYNTHASE POLYPEPTIDE VARIANT AND A METHOD FOR PRODUCING L-LEUCINE USING THE SAME

TECHNICAL FIELD

Cross Reference to Related Application(s)

The present application claims the benefit of Korean patent application No. 10-2020-0060578 filed on May 20, 2020, and the entire contents disclosed in the documents of the corresponding Korean patent applications are incorporated as a part of the present specification.

The present application relates to a novel mutated polypeptide having an isopropylmalate synthase activity; a polynucleotide encoding the same; a vector comprising the polynucleotide; a microorganism comprising the mutated polypeptide, the polynucleotide, the vector, or a combination thereof; and a method for producing L-leucine by culturing the microorganism.

BACKGROUND ART

L-Amino acids are industrially produced by fermentation methods using amino acid-producing bacteria belonging to the coryneform bacteria or the family Enterobacteriaceae which has an ability to produce an L-amino acid. As these amino acid-producing bacteria, strains isolated from the nature as well as artificial mutants of such strains and recombinant strains in which L-amino acid biosynthesis enzyme is enhanced by genetic recombination are used in order to improve the productivity.

Among the L-amino acids, L-leucine is a type of essential amino acid, one which is expensive and widely used in medicines, foods, feed additives, industrial chemicals, and the like. Further, L-leucine is mainly produced using microorganisms. The fermentation production of L-leucine is mainly carried out through a microorganism of the genus *Escherichia* or a microorganism of the genus *Corynebacterium*, which is known to biosynthesize 2-ketoisocaproate as a precursor from pyruvic acid though several steps. However, the enzymes involved in L-leucine biosynthesis cause feedback inhibition by the final product, i.e., L-leucine or a derivative thereof, thus making it difficult to perform large scale industrial production of L-leucine.

Therefore, the present inventors have found that a mutant strain obtained by altering a specific position of isopropylmalate synthase can optimize enzyme activity and thus can be used to produce L-leucine in high yield, thereby completing the present invention.

PRIOR ART LITERATURE

Patent Literature (Patent Literature 1) US 2018-0251772 A1

DISCLOSURE

Technical Problem

An object of the present application is to provide a mutated polypeptide having isopropylmalate synthase activity in which a proline amino acid residue at position 247 in the amino acid sequence of SEQ ID NO: 1 is substituted with an amino acid residue other than proline.

Another object of the present application is to provide a polynucleotide encoding the mutated polypeptide.

Another object of the present application is to provide a vector comprising the polynucleotide.

Another object of the present application is to provide a microorganism comprising at least one selected from the group consisting of the mutated polypeptide, the polynucleotide, and the vector comprising the polynucleotide.

Another object of the present application is to provide a method for producing L-leucine comprising the step of culturing the microorganism in a medium.

Another object of the present application is to provide a composition for producing L-leucine comprising at least one selected from the group consisting of the mutated polypeptide, a polynucleotide encoding the mutated polypeptide, a vector comprising the polynucleotide, and the microorgansim (for example, a mutated polypeptide of the present application, a polynucleotide of the present application, and/or a microorganism (recombinant cell) comprising a vector of the present application).

Another object of the present application is to provide a use of at least one selected from the group consisting of the mutated polypeptide, a polynucleotide encoding the mutated polypeptide, a vector comprising the polynucleotide, and the microorgansim (for example, a mutated polypeptide of the present application, a polynucleotide of the present application, and/or a microorganism (recombinant cell) comprising a vector of the present application) for producing L-leucine.

Technical Solution

In one aspect of present application, there is provided a mutated polypeptide having an isopropylmalate synthase activity in which an amino acid residue at position 247 from the N-terminal in the amino acid sequence of the isopropylmalate synthase protein of SEQ ID NO: 1 or at a position corresponding thereto is substituted with another amino acid residue.

In this specification, the term "isopropylmalate synthase (2-isopropylmalate synthase, α-isopropylmalate synthase)" refers to an enzyme that catalyzes the condensation of acetyl group of acetyl-CoA and 2-ketoisovalerate (3-methyl-2-oxobutanoate, 2-exoisovalerate) to convert it to isopropylmalate (3-carboxy-3-hydroxy-4-methylpentanoate), which is a precursor of L-leucine. The isopropylmalate synthase may comprise the enzyme having the conversion activity, regardless of an origin of a microorganism. For example, the isopropylmalate synthase may be an enzyme derived from a microorganism of the genus *Corynebacterium*.

The isopropylmalate synthase may comprise an amino acid sequence of SEQ ID NO: 1 or may consist of the amino acid sequence of SEQ ID NO: 1. Further, if the enzyme has the same or corresponding activity with the isopropylmalate synthase, as the polypeptide having homology of at least 60% or more, 70% or more, 80% or more, 85% or more, 90% or more, 92% or more, 94% or more, 96% or more, 98% or more, or 99% or more, 99.5% or more, or 99.8% or more to the amino acid sequence of SEQ ID NO: 1 regardless of the origin of the microorganism, a polypeptide having an amino acid sequence in which some sequences are deleted, modified, substituted, or added in the amino acid sequence of SEQ ID NO: 1 may also be comprised within the scope of the present application as the isopropylmalate synthase.

That is, even if it is described herein as 'a polypeptide (or protein) comprising an amino acid sequence represented by a specific sequence number or 'a polypeptide (or protein) consisting of an amino acid sequence represented by a specific sequence number', a polypeptide (or protein) having an amino acid sequence in which some sequences are deleted, modified, substituted, or added may also be used as a protein or polypeptide to be mutated in the present application, when it has the same or corresponding activity as a polypeptide (or protein) consisting of the amino acid sequence of the corresponding sequence number. For example, a polypeptide having the same or corresponding activity as the 'polypeptide consisting of the amino acid sequence of SEQ ID NO: 1' may belong to the 'polypeptide consisting of the amino acid sequence of SEQ ID NO: 1'.

The amino acid sequence of the isopropylmalate synthase and the nucleotide sequence of the gene encoding the isopropylmalate synthase may be readily obtained from databases known in the art, such as the National Center for Biotechnology Information (NCBI) and the DNA Data Bank of Japan (DDBJ).

In this specification, a polynucleotide or a polypeptide "comprising a specific nucleic acid sequence (nucleotide sequence) or an amino acid sequence" may mean that the polynucleotide or polypeptide consists of or essentially comprises the specific nucleic acid sequence (nucleotide sequence) or amino acid sequence and may be interpreted as comprising the sequences in which specific nucleic acid sequence or amino acid sequence is mutated (deleted, substituted, modified, and/or added) (or as not excluding the mutation) within the range of maintaining the original function and/or the desired function of the polynucleotide or polypeptide. In one embodiment, a polynucleotide or a polypeptide "comprising a specific nucleic acid sequence (nucleotide sequence) or an amino acid sequence" may mean that the polynucleotide or polypeptide (i) consists of or essentially comprises the specific nucleic acid sequence (nucleotide sequence) or an amino acid sequence, or (ii) consists of or essentially comprises a nucleic acid sequence or an amino acid sequence having a homology of 60% or more, 70% or more, 80% or more, 85% or more, 90% or more, 91% or more, 92% or more, 93% or more, 94% or more, 95% or more, 96% or more, 97% or more, 98% or more, 98% or more, 99.5% or more, or 99.9% or more to a specific nucleic acid sequence (nucleotide sequence) or amino acid sequence, and maintains the original function and/or the desired function.

In this specification, the amino acid sequence of isopropylmalate synthase derived from wild-type *Corynebacterium glutamicum* (e.g., ATCC13032) was represented by SEQ ID NO: 1, and the nucleotide sequence of the leuA gene encoding the isopropylmalate synthase derived from the wild-type strain was represented by SEQ ID NO: 2. The isopropylmalate synthase was shown to consist of 616 amino acids in SEQ ID NO: 1, but in some literatures, it was known to consist of 581 amino acids as the translation initiation codon is indicated after 35 amino acids, and the amino acid sequence of isopropylmalate synthase consisting of 581 amino acids was represented by SEQ ID NO: 16. The isopropylmalate synthase consisting of 581 amino acids may be comprised within the scope of the present application as the isopropylmalate synthase, and in this case, the position 247 is interpreted as the position 212, which maybe thereby comprised in the scope of the present application.

The mutated polypeptide according to one embodiment may be a polypeptide in which:
an arginine amino acid residue at position 558 (or position corresponding thereto) in the amino acid sequence of SEQ ID NO: 1 is substituted with an amino acid residue other than arginine,
a glycine amino acid residue at position 561 (or position corresponding thereto) in the amino acid sequence of SEQ ID NO: 1 is substituted with an amino acid residue other than glycine, or the polypeptide is further modified by these two substitutions.

In one embodiment, in the case of isopropylmalate synthase consisting of 581 amino acids of SEQ ID NO: 16, the position 558 is interpreted as the position 523, and the position 561 as the position 526, which is thereby comprised in the scope of the present application.

In this specification, the term "homology" refers to the percentage of identity between two polynucleotides or polypeptide moieties. The homology between sequences from a moiety to another moiety may be determined by the technique known in the art. For example, the homology may be determined by arranging the sequence information and directly arranging the sequence information, i.e., parameters such as score, identity, and similarity, etc., of two polynucleotide molecules or two polypeptide molecules using an easily accessible computer program. The computer program may be BLAST (NCBI), CLC Main Workbench (CLC bio), MegAlign™ (DNASTAR Inc), or the like. Additionally, the homology between polynucleotides may be determined by hybridizing polynucleotides under the condition of forming a stable double-strand between the homologous regions, digesting with a single strand-specific nuclease, followed by confirming size of the digested fragments.

According to one aspect, there may be provided a mutated polypeptide having an isopropylmalate synthase activity in which proline amino acid residue at position 247 (or position corresponding thereto) in the amino acid sequence of SEQ ID NO: 1 is substituted with an amino acid residue other than proline.

According to another aspect, there may be provided a mutated polypeptide having an isopropylmalate synthase activity in which proline amino acid residue at position 212 in the amino acid sequence of SEQ ID NO: 16 is substituted with an amino acid residue other than proline.

In this specification, 'position~in the amino acid sequence of SEQ ID NO: —' may be used interchangeably with 'position~from the N-terminal of the polypeptide consisting of (or comprising) the amino acid sequence of SEQ ID NO: ~.

The amino acids other than proline may comprise arginine, alanine, leucine, isoleucine, valine, phenylalanine, tryptophan, methionine, glycine, serine, threonine, cysteine, tyrosine, asparagine, glutamine, lysine, histidine, aspartic acid and glutamic acid.

According to one embodiment, the mutated polypeptide may be a polypeptide in which proline at position 247 (or a position corresponding thereto) in the amino acid sequence of SEQ ID NO: 1 is substituted with cysteine.

According to one embodiment, the mutated polypeptide may comprise an amino acid sequence of SEQ ID NO: 3 or may consist of the amino acid sequence of SEQ ID NO: 3. The mutated polypeptide according to one embodiment may be a polypeptide in which the amino acid residue at a position corresponding to the position 247 (in the case of SEQ ID NO: 16, the position 212) in the amino acid sequence of a polypeptide having homology of 60% or more, 70% or more, 80% or more, 85% or more, 90% or more, 92% or more, 94% or more, 96% or more, 98% or more, or 99% or more, 99.5% or more, or 99.8% or more to the amino acid sequence of SEQ ID NO: 1 (or SEQ ID NO: 16) is substituted with another amino acid residue.

The mutated polypeptide according to one embodiment may have increased L-leucine production activity than the polypeptide comprising the amino acid sequence of SEQ ID NO: 1 (or SEQ ID NO: 16) by substituting proline at position 247 in the amino acid sequence of SEQ ID NO: 1 (or proline at position 212 in the amino acid sequence of SEQ ID NO: 16) or the amino acid at a position corresponding thereto with another amino acid.

According to one embodiment, the mutated polypeptide, in which a proline amino acid residue at position 247 or an amino acid residue at a position corresponding thereto in the amino acid sequence of the polypeptide having the homology of 70% or more, 80% or more, 85% or more, 90% or more, 92% or more, 94% or more, 96% or more, 98% or more, or 99% or more to the amino acid sequence of SEQ ID NO: 1 or the amino acid sequence of SEQ ID NO: 1 is substituted with another amino acid residue, may have an isopropylmalate synthase activity. Said 'another amino acid residue' may mean other type of amino acid residue other than the amino acid (e.g., proline) that was present at said position (position 247 in the amino acid sequence of SEQ ID NO: 1 or position corresponding thereto) before being substituted. The mutated polypeptide according to one embodiment may have increased L-leucine production activity than the isopropylmalate synthase derived from a wild-type strain (e.g., isopropylmalate synthase comprising (or consisting of) the amino acid sequence of SEQ ID NO: 1 or SEQ ID NO: 16) by substituting proline at position 247 (or position 212) in the amino acid sequence of SEQ ID NO: 1 (or SEQ ID NO: 16) or the amino acid residue at a position corresponding thereto, with another residue.

The mutated polypeptide according to one embodiment may have increased enzymatic activity of isopropylmalate synthase than the isopropylmalate synthase derived from a wild-type strain (e.g., isopropylmalate synthase consisting of the amino acid sequence of SEQ ID NO: 1 (or SEQ ID NO: 16)) by substituting proline at position 247 (or position 212) in the amino acid sequence of SEQ ID NO: 1 (or SEQ ID NO: 16) or the amino acid residue at a position corresponding thereto, with another residue.

In this specification, the term "increase in activity of isopropylmalate synthase" refers to an increase in the conversion activity to isopropylmalate. Therefore, the mutated polypeptide according to one embodiment may have a higher level of the isopropylmalate conversion activity compared to a polypeptide having an isopropylmalate synthase activity comprising the amino acid sequence of SEQ ID NO: 1 (or SEQ ID NO: 16).

In this specification, the term "increase in activity" may be used interchangeably with "enhanced activity". Further, isopropylmalate is one of the precursors of L-leucine, and thus, using the mutated polypeptide according to one embodiment results in producing a higher level of L-leucine compared to a polypeptide having an isopropylmalate synthase activity comprising the amino acid sequence of SEQ ID NO: 1 (or SEQ ID NO: 16).

The isopropylmalate conversion activity may be directly confirmed by measuring the level of isopropylmalate produced, or may be indirectly confirmed by measuring the level of CoA produced. The enzymatic activity of isopropylmalate synthase may be measured by a known method, for example, may be measured according to the method described in Kohlhaw et al. (Methods in Enzymology 166: 423-9 (1988)) and the change in absorbance at 412 nm due to thionitrobenzoate (TNB) formed from DTNB (5,5'-dithiobis-(2-nitrobenzoic acid), Ellman's reagent) by reduction using the CoA produced may be measured, thereby determining the activity of the isopropylmalate synthase enzyme.

The mutated polypeptide according to one embodiment may reduce feedback inhibition by L-leucine and/or a derivative thereof as compared with isopropylmalate synthase derived from a wild-type strain (for example isopropylmalate synthase consisting of the amino acid sequence of SEQ ID NO: 1) by substituting proline at position 247 (or position 212) in the amino acid sequence of SEQ ID NO: 1 (or SEQ ID NO: 16) or the amino acid sequence at a position corresponding thereto with another amino acid.

In this specification, the term "feedback inhibition" means that the end product of the enzyme system inhibits a reaction at the initial stage of the enzyme system. For example, the feedback inhibition may mean that L-leucine or a derivative thereof inhibits the activity of isopropylmalate synthase, which mediates the first step of the biosynthetic pathway thereof. Therefore, when the feedback inhibition of isopropylmalate synthase is reduced (or released), the productivity of L-leucine may be increased compared to the case where it is not.

In this specification, the term "derivative" may refer to compounds which are known to be capable of inhibiting an ability to produce L-leucine from microorganisms by inducing feedback inhibition in relation to the biosynthesis of L-leucine which is the final product of the present invention. Examples thereof may comprise isoleucine, terleucine, norleucine, and/or cycloleucine, etc.

According to one embodiment, the mutated polypeptide may be a polypeptide in which a position other than position 247 (or position 212) in the amino acid sequence of SEQ ID NO: 1 (or SEQ ID NO: 16) is additionally mutated, thereby synergistically increasing one or more effects selected from the group consisting of (1) an increase in L-leucine production activity; (2) an increase in enzymatic activity of isopropylmalate synthase; and (3) a reduction of feedback inhibition by L-leucine and/or a derivative thereof.

According to one embodiment, the mutated polypeptide may further comprise mutations that may exhibit one or more effects selected from the group consisting of (1) an increase in L-leucine production activity; (2) an increase in enzymatic activity of isopropylmalate synthase; and (3) a reduction of feedback inhibition by L-leucine and/or a derivative thereof.

The mutated polypeptide may be a polypeptide in which:
an arginine amino acid residue at position 558 (or a position corresponding thereto) in the amino acid sequence of SEQ ID NO: 1 is substituted with an amino acid residue other than arginine,
a glycine amino acid residue at position 561 (or a position corresponding thereto) in the amino acid sequence of SEQ ID NO: 1 is substituted with an amino acid residue other than glycine, or the polypeptide is further modified by these two substitutions.

The mutated polypeptide may be a polypeptide in which:
an arginine amino acid residue at position 523 (or a position corresponding thereto) in the amino acid sequence of SEQ ID NO: 16 is substituted with an amino acid residue other than arginine,
a glycine amino acid residue at position 526 (or a position corresponding thereto) in the amino acid sequence of SEQ ID NO: 16 is substituted with an amino acid residue other than glycine, or the polypeptide is further modified by these two substitutions.

The amino acid other than arginine may comprise alanine, leucine, isoleucine, valine, proline, phenylalanine, tryptophan, methionine, glycine, serine, threonine, cysteine, tyrosine, asparagine, glutamine, lysine, histidine, aspartic acid, and glutamic acid; and the amino acid other than glycine may comprise alanine, leucine, isoleucine, valine, proline, phenylalanine, tryptophan, methionine, arginine, serine, threonine, cysteine, tyrosine, asparagine, glutamine, lysine, histidine, aspartic acid, and glutamic acid; but not limited thereto.

According to one embodiment, the amino acid other than arginine may be histidine.

According to one embodiment, the amino acid other than glycine may be aspartic acid.

According to one embodiment, the mutated polypeptide may be a polypeptide in which:
- an arginine amino acid residue at position 558 in the amino acid sequence of SEQ ID NO: 1 is substituted with a histidine amino acid residue,
- a glycine amino acid residue at position 561 in the amino acid sequence of SEQ ID NO: 1 is substituted with an aspartic acid amino acid residue, or
- the polypeptide is further modified by these two substitutions.

According to one embodiment, the mutated polypeptide may comprise the amino acid sequence of SEQ ID NO: 5, or may consist of the amino acid sequence of SEQ ID NO: 5.

In the mutated polypeptide in which amino acid residue at position 247 (or position 212) in the amino acid sequence of SEQ ID NO: 1 (or SEQ ID NO: 16) is substituted with an amino acid residue other than proline,
- a mutated polypeptide in which arginine amino acid residue at position 558 (or position 523) in the amino acid sequence of SEQ ID NO: 1 (or SEQ ID NO: 16) is substituted with an amino acid residue other than arginine, the glycine amino acid residue at position 561 (or position 526) is substituted with an amino acid residue other than glycine, or the polypeptide is further modified by these two substitutions, may be a polypeptide in which:
- as compared with a mutated polypeptide in which (i) isopropylmalate synthase derived from a wild-type strain (for example, isopropylmalate synthase comprising the amino acid sequence of SEQ ID NO: 1 or SEQ ID NO: 16) or (ii) the proline amino acid residue at position 247 (or positon 212) in the amino acid sequence of SEQ ID NO: 1 (or SEQ ID NO: 16) is substituted with an amino acid residue other than proline, one or more effects selected from the group consisting of the following (1) to (3) may be increased:
  (1) increase in L-leucine production activity;
  (2) increase in enzymatic activity of isopropylmalate synthase; and
  (3) reduction of feedback inhibition by L-leucine and/or a derivative thereof.

According to one embodiment, depending on the combination of mutations in which amino acid at positions 247, 558, and/or 561 (or positions 212, 523, and/or 526) in the amino acid sequence of SEQ ID NO: 1 (or SEQ ID NO: 16) is substituted with another type of amino acid, the mutated polypeptide according to one embodiment may have synergistically increased one or more effects selected from the group consisting of the following (1) to (3):
  (1) increase in L-leucine production activity;
  (2) increase in enzymatic activity of isopropylmalate synthase; and
  (3) reduction of feedback inhibition by L-leucine and/or a derivative thereof.

The effects of (1) to (3) above are the same as described above.

According to another aspect, there may be provided a polynucleotide encoding the mutated polypeptide. In this specification, the term "polynucleotide" is a polymer of nucleotides in which nucleotide monomers are covalently linked in a long chain shape, and is a DNA or RNA strand having a certain length or longer. More specifically, it may mean a polynucleotide fragment encoding the mutated polypeptide.

The mutated polypeptide is the same as described above.

The polynucleotide may comprise, without limitation, a polynucleotide sequence encoding the mutated polypeptide of the present application.

According to one embodiment, it may be a polynucleotide encoding a polypeptide in which a proline amino acid residue at position 247 (or position 212) in the amino acid sequence of SEQ ID NO: 1 (or SEQ ID NO: 16) is substituted with an amino acid residue other than proline, or a polynucleotide encoding a polypeptide which has a homology of 60% or more, 70% or more, 80% or more, 85% or more, 90% or more, 92% or more, 94% or more, 96% or more, 98% or more, or 99% or more, 99.5% or more, or 99.8% or more to the amino acid sequence of SEQ ID NO: 1 (or SEQ ID NO: 16), in which an amino acid residue at a position corresponding to position 247 (or position 212) in the amino acid sequence of SEQ ID NO: 1 (or SEQ ID NO: 16) is substituted with other amino acid residue, or encoding a polypeptide in which some of the sequences are deleted, modified, substituted or added thereof.

According to one embodiment, the polynucleotide may comprise without limitation as long as it is a probe that may be prepared from a known gene sequence, for example, a probe capable of hybridizing with a complementary sequence for all or part of the polynucleotide sequence under stringent conditions, and comprising a sequence corresponding to a sequence encoding a protein variant in which an amino acid at position 247 (or position 212) or a corresponding thereto in the amino acid sequence of SEQ ID NO: 1 (or SEQ ID NO: 16) is substituted with other amino acid. The term "stringent conditions" refers to conditions under which a so-called specific hybrid is formed while non-specific hybrids are not formed. Examples of such conditions comprise conditions under which genes having high degrees of homology, such as genes having a homology of 60% or more, 70% or more, 80% or more, 85% or more, 90% or more, 92% or more, 94% or more, 96% or more, 98% or more, or 99% or more, 99.5% or more, or 99.8% or more, hybridize with each other while genes having low degrees of a homology do not hybridize with each other, or conditions under which genes are washed 1 time, and specifically 2 and 3 times, at a temperature and a salt concentration equivalent to 60° C., 1x SSC, and 0.1% SDS, specifically 60° C., 0.1×SSC, and 0.1% SDS, and more specifically 68° C., 0.1×SSC, and 0.1% SDS, which are the conditions for washing of ordinary Southern hybridization (Sambrook et al., Molecular Cloning: A Laboratory Manual, 3rd Ed., Cold Spring Harbor Laboratory Press, Cold Spring Harbor, N.Y. (2001)).

The probe used in the hybridization may be a part of the complementary sequence of the nucleotide sequence. Such probe may be constructed by PCR using an oligonucleotide prepared based on a known sequence as a primer and using a gene fragment containing such nucleotide sequence as a template. For example, a gene fragment having a length of about 300 bp may be used as a probe. More specifically, in the case of using a probe having a length of about 300 bp, 50° C., 2×SSC, and 0.1% SDS may be suggested for the washing conditions of hybridization.

According to one embodiment, the polynucleotide may comprise the nucleotide sequence of SEQ ID NO: 4 or SEQ ID NO: 6, or may consist of the nucleotide sequence of SEQ ID NO: 4 or SEQ ID NO: 6, and the polynucleotide that may be translated into the mutated polypeptide according to one embodiment by codon degeneracy may also be comprised in the scope of the present application.

According to another aspect, there may be provided a vector comprising the polynucleotide.

In this specification, the term "vector" refers to any carrier for cloning and/or transferring nucleotides to a host cell. A vector may be a replicon to allow for the replication of the fragments combined with other DNA fragments. "Replicon" refers to any genetic (e.g., plasmid, phage, cosmid, chromosome, and virus) unit acting as a self-replicating of DNA replication in vivo, that is, replicable by self-regulation.

In one embodiment, the vector may be a DNA construct comprising a polynucleotide sequence encoding the target protein, which is operably linked to a suitable regulatory sequence such that the target protein may be expressed in an appropriate host. The regulatory sequence may comprise a promoter capable of initiating transcription, any operator sequence for the control of the transcription, a sequence encoding an appropriate mRNA ribosome-binding domain, and a sequence controlling the termination of transcription and translation. After being transformed into a suitable host cell, the vector may be replicated or function irrespective of the host genome, and it may be integrated into the host genome itself.

In this specification, the term "operably linked" means that the gene sequence is functionally linked to a promoter sequence which initiates and mediates the transcription of the polynucleotide encoding the polypeptide.

The vector is not particularly limited as long as it is capable of replicating in a host cell, and any vector known in the art may be used. For example, the vector may be natural or recombinant plasmids, cosmids, viruses, and bacteriophages. As a phage vector or a cosmid vector, MBL3, MBL4, IXII, ASHII, APII, t10, t11, pWE15, M13, λEMBL3, λEMBL4, λFIXII, λDASHII, λZAPII, λgt10, λgt11, Charon4A, and/or Charon21A, and the like may be used, and as a plasmid vector, pDZ vectors, pBR based, pUC based, pBluescript II based, pGEM based, pTZ based, pCL based, and/or pET based vectors, and the like may be used. For example, pCR2.1, pDC, pDZ, pACYC177, pACYC184, pCL, pECCG117, pUC19, pBR322, pMW118 and/or pCC1BAC vectors and the like may be used.

According to another aspect, there may be provided a microorganism (or recombinant cell) comprising at least one selected from the group consisting of the mutated polypeptide, the polynucleotide encoding the mutated polypeptide, and the vector comprising the polynucleotide.

The details concerning the mutated polypeptide, the polynucleotide and the vector are the same as described above.

The microorganism (or recombinant cell) may further comprise a mutation that increases L-leucine production, and the position of the mutation and/or the type of the gene to be mutated may be comprised without limitation as long as it increases L-leucine production.

The microorganism (or recombinant cell) may further comprise a mutation that enhances the activity of an enzyme involved in L-leucine biosynthesis. Enhancing the activity of the enzyme is the same as described above.

The microorganism (recombinant cell) may be used without limitation as long as it is a cell capable of transformation.

The microorganism (or recombinant cell) may have an L-leucine producing ability. The microorganism (or recombinant cell) may have a more improved L-leucine-producing ability or may have an L-leucine-producing ability that a cell, a parent strain, and/or a wild-type strain prior to recombination do not have.

The microorganism (or recombinant cell) may be a polypeptide in which an amino acid sequence corresponding to isopropylmalate synthase is mutated, so that its activity is increased compared to a wild-type strain, a parent strain, and/or a cell prior to recombination, or feedback inhibition for L-leucine and its derivative is released, or both the increase in the activity of the enzyme and the release of the feedback inhibition may be achieved.

The microorganism (or recombinant cell) may be one in which a polynucleotide according to one embodiment is integrated into a chromosome, and for example, the polynucleotide according to one embodiment may be exchanged for a native leuA gene (gene encoding isopropylmalate synthase) at a gene site in a chromosome or integrated into an additional gene site.

In this specification, "having an L-leucine producing ability" refers to microorganisms in which leucine producing ability is imparted to cells and/or microorganisms that do not have leucine producing ability, or cells and/or microorganisms that have naturally leucine-producing ability. For example, microorganisms of the genus *Corynebacterium* having an L-leucine producing ability refers to a microorganism of the genus *Corynebacterium* that has an improved L-leucine producing ability by inserting an external gene related to the mechanism of leucine production, or enhancing or inactivating the activity of a native gene or a natural microorganism itself. The microorganism may be a microorganism of the genus *Corynebacterium*.

The microorganism of the genus *Corynebacterium* may be *Corynebacterium glutamicum*, *Corynebacterium ammoniagenes*, *Corynebacterium acetoacidophilum*, *Corynebacterium acetoglutamicum*, *Corynebacterium alkanolyticum*, *Corynebacterium callunae*, *Corynebacterium lilium*, *Corynebacterium melassecola*, *Corynebacterium thermoaminogenes*, *Corynebacterium efficiens*, and/or *Corynebacterium herculis*, etc.

The microorganism (or recombinant cell) may comprise being artificially produced through transformation and/or occurred naturally. For example, the microorganism (or recombinant cell) may be transformed with a polynucleotide encoding a mutated polypeptide according to one embodiment or a vector comprising the same.

In this specification, the term "transformation" refers to the introduction of a gene or a polynucleotide into a host cell so that it may be expressed in a host cell, and the transformed gene or polynucleotide may comprise both a form inserted into the chromosome of a host cell and a form located outside the chromosome, without limitation, as long as it may be expressed in the host cell.

In this specification, the method of transformation comprises without limitation as long as it is a method of introducing a gene into a cell, and may be carried out by selecting a suitable standard technique as known in the art, depending on the host cell. For example, electroporation, calcium phosphate ($CaPO_4$) precipitation, calcium chloride ($CaCl_2$) precipitation, microinjection, retroviral infection, polyethylene glycol (PEG) method, DEAE-dextran method, cationic liposome method, and/or lithium acetate-DMSO method, and the like may be used, but are not limited thereto.

The microorganism (or recombinant cell) may be one in which a polynucleotide sequence according to one embodiment is integrated into a chromosome. The homologous recombination allows the exchange of DNA fragments on the chromosome for a polynucleotide according to one embodiment that is transferred by the vector into a cell, along with the use of a vector according to one embodiment. For efficient recombination between the cyclic DNA molecule of the vector and the target DNA on the chromosome, the exchanged DNA region comprising the polynucleotide according to one embodiment is provided with a nucleotide sequence homologous to the target site at the end; and these determine a vector integration site and a DNA exchange site. For example, a polynucleotide according to one embodiment may be exchanged for a native leuA gene at a native gene site within a chromosome or may be incorporated into an additional gene site.

According to another aspect, there may be provided a method for producing L-leucine, which comprises the step of culturing the microorganism (or recombinant cell) in a medium.

In one embodiment, the method may further comprise the step of collecting L-leucine from the cultured medium or microorganism (or recombinant cell).

The culturing may be carried out according to an appropriate medium and culture conditions known in the art, must meet the requirements of a specific strain in an appropriate manner, and may be appropriately modified by a person skilled in the art.

The culture method may comprise, for example, batch culture, continuous culture, fed-batch culture, or a combination culture thereof, but is not limited thereto.

The medium for culturing a microorganism (or a recombinant cell) may refer to known literature (Manual of Methods for General Bacteriology. American Society for Bacteriology. Washington D.C., USA, 1981), but is not limited thereto.

According to one embodiment, the medium may comprise various carbon sources, nitrogen sources, and trace element components, and the recombinant cells may be cultured while adjusting the temperature and/or pH in an ordinary medium comprising an appropriate carbon source, nitrogen source, amino acid, vitamin, and the like. The carbon source comprises sugars and carbohydrates such as glucose, sucrose, lactose, fructose, maltose, starch, and/or cellulose, oils and fats such as soybean oil, sunflower oil, castor oil, and/or coconut oil, fatty acids such as palmitic acid, stearic acid, and/or linoleic acid, alcohols such as glycerol, and/or ethanol, organic acids such as acetic acid. These materials may be used alone or in combination of two or more, but are not limited thereto. The nitrogen source that may be used may comprise peptone, yeast extract, meat juice, malt extract, corn steep liquor, soybean flour and urea or inorganic compounds, for example, ammonium sulfate, ammonium chloride, ammonium phosphate, ammonium carbonate and ammonium nitrate. The nitrogen source may also be used alone or in combination of two or more, but is not limited thereto. A phosphorus source that may be used may comprise potassium dihydrogen phosphate or dipotassium hydrogen phosphate or corresponding sodium-containing salts, but is not limited thereto. Further, the medium may comprise a metal salt such as magnesium sulfate or iron sulfate required for growth, but is not limited thereto. In addition, essential growth substances such as amino acids and vitamins may be comprised. Further, precursors suitable for the medium may be used. The medium or individual components may be added in a batch or continuous manner to the culture medium during the culture process, but is not limited thereto.

According to one embodiment, compounds such as ammonium hydroxide, potassium hydroxide, ammonia, phosphoric acid, and sulfuric acid may be added to a culture medium of microorganism in an appropriate manner during culture to adjust the pH of the culture medium. In addition, the formation of bubbles may be suppressed by using an antifoaming agent such as fatty acid polyglycol ester during culture. Additionally, in order to maintain the aerobic state of the culture medium, oxygen or an oxygen-containing gas (e.g., air) may be injected into the culture medium. The temperature of the culture medium may be 20° C. to 45° C., 25° C. to 40° C., or 30° C. to 37° C. The culture period may be continued until a useful substance (e.g., L-leucine) is obtained in a required production amount, and may be, for example, 10 to 160 hours.

The step of isolating or collecting L-leucine from the cultured microorganism (or recombinant cell) and/or cultured medium may be carried out using a suitable method known in the art depending on the culturing method. For example, centrifugation, filtration, extraction, spraying, drying, distillation, precipitation, crystallization, electrophoresis, fractional dissolution (e g, ammonium sulfate precipitation), and/or chromatography (e.g., ion exchange, affinity, hydrophobicity and size exclusion) may be used, but is not limited thereto. The cultured medium refers to a medium in which a microorganism (or a recombinant cell) was cultured.

According to one embodiment, the step of isolating or collecting L-leucine maybe carried out by centrifuging the culture at low speed to remove the biomass, and isolating the resulting supernatant via ion exchange chromatography.

The method for producing L-leucine may further comprise a step of purifying L-leucine.

According to another aspect, there may be provided a composition for producing L-leucine comprising at least one selected from the group consisting of a mutated polypeptide of the present application, a polynucleotide encoding the mutated polypeptide, a vector comprising the polynucleotide, and the microorgansim (for example, a mutated polypeptide of the present application, a polynucleotide of the present application, and/or a microorganism (recombinant cell) comprising a vector of the present application).

A composition of the present may further comprise any suitable excipient commonly used in compositions for the production of amino acids, and the excipient, for example, may be preservative, a wetting agent, a dispersing agent, a suspending agent, a buffering agent, a stabilizing agent, or an isotonic agent, but is not limited thereto.

In the composition of the present application, mutated polypeptides, polynucleotides, vectors, microorganisms, and media are the same as those described in the other aspects above.

According to another aspect, there may be provided a use of at least one selected from the group consisting of the mutated polypeptide, a polynucleotide encoding the mutated polypeptide, a vector comprising the polynucleotide, and the microorgansim (for example, a mutated polypeptide of the present application, a polynucleotide of the present application, and/or a microorganism (recombinant cell) comprising a vector of the present application) for producing L-leucine.

In the use of the present application, mutated polypeptides, polynucleotides, vectors, microorganisms, and media are the same as those described in the other aspects above.

Advantageous Effects

By using the mutated polypeptide according to one embodiment, it is possible to produce L-leucine in high yield.

DETAILED DESCRIPTION OF THE EMBODIMENTS

Hereinafter, the present invention will be described in more detail with reference to the following examples, but the scope of the present invention is not intended to be limited by these examples.

Example 1. Construction of DNA Library Encoding Mutated Isopropylmalate Synthase

Example 1-1. Construction of Vector Comprising leuA

In order to construct a leuA mutant library encoding a variant having an isopropylmalate synthase activity, a recombinant vector comprising leuA was first constructed.

In order to amplify the leuA gene (SEQ ID NO: 2) encoding the LeuA (2-isopropylmalate synthase) protein (SEQ ID NO: 1, Uniprot accession code: P42455) derived from wild-type Corynebacterium glutamicum, the PCR method was performed using the chromosome of Corynebacterium glutamicum ATCC13032 wild strain as a template and using primers of SEQ ID NOs: 7 and 8 under the following conditions repeated 25 cycles: denaturation at 94° C. for 1 min, annealing at 58° C. for 30 sec, and polymerization at 72° C. for 1 min using Pfu DNA polymerase. The specific sequences of the primers used are shown in Table 1 below.

The amplified PCR product was cloned into E. coli vector pCR2.1 using the TOPO Cloning Kit (Invitrogen) according to the manufacturer's manual to obtain 'pCR-leuA'.

TABLE 1

| SEQ ID NO | Sequence (5'→3') |
|---|---|
| SEQ ID NO: 7 | CTAATCTCGAGGTCACCCATGTCTCCTAAC |
| SEQ ID NO: 8 | GGCTGGCGGCGTTTAAAACCGGTTGAT |

Example 1-2. Construction of leuA Mutant Library

Based on the vector constructed in Example 1-1, a leuA mutant library was constructed using an error-prone PCR kit (clontech Diversify® PCR Random Mutagenesis Kit). Under conditions where 0 to 3 mutations occurred per 1000 bp, a PCR reaction was performed using the pCR-leuA vector as a template and using primers of SEQ ID NO: 7 and SEQ ID NO: 8. Specifically, as the condition where 0 to 3 mutations occurred per 1000 bp, the PCR reaction was performed under the following conditions: pre-heating at 94C for 30 sec, and then 25 cycles of 94° C. for 30 sec and 68° C. for 1 min and 30 sec. The obtained PCR product was used as a megaprimer (50~125 ng), and the PCR reaction was performed by repeating 25 cycles of 95° C. for 50 sec, 60° C. for 50 sec, and 68° C. for 12 m, followed by DpnI-treatment. The DpnI-treated PCR product was transformed into E. coli DH5a through a heat shock method and spread on LB solid medium containing kanamycin (25 mg/L). After selecting 20 transformed colonies, plasmids were obtained, and the nucleotide sequence was analyzed. As a result, it was confirmed that mutations were introduced at mutually different positions with a frequency of 2 mutations/kb. About 20,000 transformed E. coli colonies were taken, and plasmids were extracted, which was named 'pTOPO-leuA-library'.

Example 2. Evaluation of Constructed Library and Selection of Variants

Example 2-1. Selection of Mutant Strains with Increased L-Leucine Production Amount The pTOPO-leuA-library constructed in Example 1-2 was transformed into wild-type Corynebacterium glutamicum ATCC13032 by electroporation therapy, the transformed strain was spread on a nutrient medium (Table 2) containing 25 mg/L kanamycin, and colonies of 10,000 strains into which the mutant gene was inserted were selected. Each selected colony was named ATCC13032/pTOPO_JeuA(mt) 1 to ATCC13032/pTOPO_JeuA(mt) 10,000. To identify colonies with increased L-leucine production amount among the 10,000 colonies obtained, the fermentation titer was evaluated for each colony in the following manner

TABLE 2

| Type of medium | Components |
|---|---|
| Production medium | Glucose 100 g, $(NH_4)_2SO_4$ 40 g, soy protein 2.5 g, corn steep solids 5 g, urea 3 g, $KH_2PO_4$ 1 g, $MgSO_4 \cdot H_2O$ 0.5 g, biotin 100 μg, thiamine hydrochloride 1,000 μg, calcium-pantothenate 2000 μg, nicotinamide 3,000 μg, $CaCO_3$ 30 g; (based on 1 liter of distilled water), pH 7.0 |
| Nutrient medium | Glucose 10 g, meat juice 5 g, polypeptone 10 g, sodium chloride 2.5 g, yeast extract 5 g, agar 20 g, urea 2 g (based on 1 liter of distilled water) |

Each colony was inoculated into a 250 ml corner-baffled flask containing 25 μg/ml kanamycin in 25 ml of autoclave-sterilized production medium (Table 2) using a platinum loop, and then subjected to shaking culture at 30° C. with a shaking rate of 200 rpm for 60 hours. After completion of the culture, L-leucine production amount was measured by a method using high performance liquid chromatography (HPLC, SHIMAZDU LC20A).

Of the 10,000 colonies obtained, one strain (ATCC13032/pTOPO_leuA(mt)5306) having the most improved L-leucine producing ability compared to the wild-type Corynebacterium glutamicum strain (ATCC13032) was selected. The concentration of L-leucine produced in the selected strain (ATCC13032/pTOPO_JeuA(mt)5306) is shown in Table 3 below.

TABLE 3

| Strain name | L-leucine (g/L) |
|---|---|
| ATCC13032 | 0.87 |
| ATCC13032/pTOPO_leuA(mt)5306 | 1.32 |

As shown in Table 3, Corynebacterium glutamicum ATCC13032/pTOPO_JeuA(mt) 5306 strain having a mutation in the leuA gene increased an L-leucine producing ability by about 1.5 times as compared with the parent strain, Corynebacterium glutamicum ATCC13032.

Example 2-2. Confirmation of Mutations in Mutant Strains with Increased L-Leucine Production In order to confirm the leuA gene mutation of Corynebacterium glutamicum ATCC13032/pTOPO_JeuA(mt)

5306 strain, PCR was performed using the DNA of ATCC13032/pTOPO_JeuA(mt)5306 strain as a template and using primers of SEQ ID NO: 9 and SEQ ID NO: 10 listed in Table 4 under the following conditions: denaturation at 94° C. for 5 min, then 30 cycles of 94° C. for 30 sec, 55° C. for 30 sec, and 72° C. for 1 min and 30 sec, followed by 72° C. for 5 min, and DNA sequencing was performed.

TABLE 4

| SEQ ID NO | Sequence (5'→3') |
|---|---|
| SEQ ID NO: 9 | AACACGACCGGCATCCCGTCGC |
| SEQ ID NO: 10 | AAATCATTTGAGAAAACTCGAGG |

As a result of the sequencing, it was confirmed that in the ATCC13032/pTOPO_JeuA(mt)5306 strain, CC, which is the 739th and 740th nucleotides of the leuA gene, is substituted with TG. This means capable of encoding a variant (hereinafter, P247C) in which proline, which is an amino acid at position 247 (position 212 if the LeuA protein consist 581 amino acids (SEQ ID NO: 16) as the translation initiation codon is indicated after 35 amino acids, based on the known literature; hereinafter, represented only by position 247) of the LeuA protein is substituted with cysteine. The amino acid sequence of the LeuA variant (P247C) and the nucleotide sequence of the leuA variant encoding the same are the same as those of SEQ ID NO: 3 and SEQ ID NO: 4, respectively.

In the following examples, it was attempted to confirm whether the mutation (P247C) affects the L-leucine production amount of the microorganism of the genus Corynebacterium.

Example 3. Confirmation of L-Leucine Producing Ability of Selected Mutant Strains

Example 3-1. Construction of Insertion Vectors Containing leuA Mutation

In this example, in order to introduce the selected mutation (P247C) into strains using the site directed mutagenesis method, it was attempted to construct a vector for insertion. PCR was performed using a chromosome of Corynebacterium glutamicum wild type (ATCC13032) as a template and using primers of SEQ ID NOs: 11 and 12 and primer pairs of SEQ ID NOs: 13 and 14. Specifically, PCR was performed under the following conditions: denaturation at 94° C. for 5 min, then 30 cycles of 94° C. for 30 sec, 55° C. for 30 sec, and 72° C. for 1 min and 30 sec, followed by 72° C. for 5 min. The specific sequences of the primers used are shown in Table 5.

TABLE 51

| SEQ ID NO | Sequence (5'→3') |
|---|---|
| SEQ ID NO: 11 | GTGAATTCGAGCTCGGTACCCAAATCATTTGAGAAAACTCGAGGC |
| SEQ ID NO: 12 | GGTGATCATCTCAACGGTGGAACACAGGTTGATGATCATTGGGTT |
| SEQ ID NO: 13 | AACCCAATGATCATCAACCTGTGTTCCACCGTTGAGATGATCACC |
| SEQ ID NO: 14 | GGTCGACTCTAGAGGATCCCCAAGAAGGCAACATCGGACAGC |

The resulting PCR product was cleaved with SmaI restriction enzyme to obtain a linear pDZ vector, and the homologous sequence of the terminal 15 base between DNA fragment was fused and cloned using an In-Fusion enzyme, thereby a vector 'pDZ-leuA (P247C)' in which proline (Pro), which is the 247th amino acid of LeuA, was substituted with cysteine (Cys) was constructed.

Example 3-2. Introduction of leuA Gene Mutation in ATCC13032 Strain

The pDZ-leuA (P247C) vector constructed in Example 3-1 was transformed into ATCC13032 by electroporation therapy, and strains having a vector inserted on a chromosome by recombination of the homologous sequence were selected in a medium containing 25 mg/L of kanamycin. The selected primary strain was again subjected to a secondary cross-over, and a strain in which a mutation was introduced into the leuA gene was selected. Whether or not the leuA gene mutation was introduced into the finally transformed strain was confirmed through nucleotide sequence analysis after PCR was performed using the primers of SEQ ID NO: 9 and SEQ ID NO: 15 under the following conditions: 94° C. for 5 min, then 30 cycles of 94° C. for 30 sec/55° C. for 30 sec/72° C. for 90 sec, followed by 72° C. for 5 min. As a result of nucleotide sequence analysis, it was confirmed that CC, in which the 739th and 740th nucleotides of the leuA gene in strain chromosome were substituted with TG, and a leuA mutation encoding LeuA, in which the 247th amino acid proline (Pro) was substituted with cysteine (Cys), was introduced in the strain. The produced strain was named 'ATCC13032_leuA_P247C'. The specific sequences of the primers used are shown in Tables 4 and 6

TABLE 61

| SEQ ID NO | Sequence (5'→3') |
|---|---|
| SEQ ID NO: 15 | ATCCATTCAATGGAGTCTGCG |

Example 3-3. Evaluation of L-Leucine Producing Ability of Mutant Strains

In order to evaluate the L-leucine producing ability of the ATCC13032_leuA_P247C strain produced in Example 3-2, flask fermentation titer was evaluated similarly to the method of Example 2. The parent strains, Corynebacterium glutamicum ATCC13032 and ATCC13032_leuA_P247C, were respectively inoculated into a 250 ml corner-baffled flask containing 25 ml of production medium using a platinum loop, and then subjected to shaking culture at 30°

C. with a shaking rate of 200 rpm for 60 hours for producing L-leucine. After completion of the culture, L-leucine production amount was measured by HPLC, and the concentration of L-leucine in the culture medium for each strain is shown in Table 7 below.

TABLE 7

| Strain name | L-leucine (g/L) |
|---|---|
| ATCC13032 | 0.87 |
| ATCC13032_leuA_P247C | 1.35 |

As shown in Table 7, ATCC13032_leuA_P247C improved the yield of L-leucine by about 1.55 times as compared with the parent strain, *Corynebacterium glutamicum* ATCC13032.

Example 4. Evaluation of Leucine-Producing Ability in Leucine-Producing Mutant Strains Since the wild-type strain of the genus *Corynebacterium* produces a trace amount of L-leucine, a leucine-producing strain derived from ATCC13032 was produced, and the mutation (P247C) selected in Example 2 was introduced to confirm an L-leucine-producing ability. The specific experiment was performed as follows.

Example 4-1. Production of L-Leucine-Producing Strain CJL-8100 Strain

As a strain for the production of high concentration L-leucine, a strain derived from ATCC13032 comprising as follow mutations was produced: (1) a mutation (R558H) in which arginine, which is the 558th amino acid of the LeuA protein, was substituted with histidine, by substituting G, which is the 1673th nucleotide of the leuA gene, with A, and (2) a mutation (G561D) in which glycine, which is the 561th amino acid, was substituted with aspartic acid, by substituting GC, which is the 1682th and 1683th nucleotides of the leuA gene, with AT.

Specifically, the pDZ-leuA (R558H, G561D) vector comprising the leuA gene mutation (KR10-2018-0077008 A) was transformed into *Corynebacterium glutamicum* ATCC13032 by electroporation therapy, and a strain having a vector inserted on a chromosome by recombination of the homologous sequence was selected in a medium containing 25 mg/L of kanamycin. The selected primary strain was again subjected to a secondary cross-over, and a strain into which the mutation of the leuA gene was introduced was selected. Finally, whether or not to introduce mutations of the transformed strain was then confirmed, in which PCR was performed using the primers of SEQ ID NO: 7 and SEQ ID NO: 13 under the following conditions: 94° C. for 5 min, then 30 cycles of 94° C. for 30 sec/55° C. for 30 sec/72° C. for 90 seconds, followed by 72° C. for 5 min, and the nucleotide sequence was analyzed, thereby confirming that the R558H and G561D mutations were introduced. The specific sequences of the primers used are listed in Tables 1 and 5. The ATCC13032_leuA_(R558H, G561D) strain transformed with the pDZ-leuA (R558H, G561D) vector was named "CJL-8100".

Example 4-2. Construction of Insertion Vector Comprising leuA Mutation

In this example, in order to introduce the mutation (P247C) selected in Example 2 into CJL-8100, which is an L-leucine-producing strain in which two mutations (R558H, G561D) were introduced into LeuA, it was attempted to construct a vector for insertion.

PCR was performed using the chromosome of the CJL-8100 strain as a template, and using primers of SEQ ID NOs: 9 and 10, and primer pairs of SEQ ID NOs: 11 and 12. PCR was performed under the following conditions: denaturation at 94° C. for 5 min, then 30 cycles of 94° C. for 30 sec, 55° C. for 30 sec and 72° C. for 1 min and 30 sec, followed by polymerization at 72° C. for 5 min. The resulting PCR product was cleaved with SmaI restriction enzyme to obtain a linear pDZ vector, and the homologous sequence of the terminal 15 base between DNA fragment was fused and cloned using an In-Fusion enzyme, thereby the vector pDZ-leuA(P247C, R558H, G561D) which comprises a leuA mutation encoding a LeuA variant in which arginine, which is the 558th amino acid, is substituted with histidine, and glycine, which is the 561th amino acid, is substituted with aspartic acid in the LeuA amino acid sequence of the wild-type strain, and proline (Pro), the 247th amino acid of LeuA, is substituted with cysteine (Cys), was constructed.

Example 4-3. Introduction and Evaluation of LeuA Mutant (P247C) in CLJ-8100 Strain CJL-8100, which is an L-leucine-producing strain, was transformed with the pDZ-leuA (P247C, R558H, G561D) vector produced in Example 4-2, and strains in which the vector was inserted on the chromosome by recombination of homologous sequences were selected in a medium containing 25 mg/L of kanamycin. The selected primary strain was again subjected to a secondary cross-over, and the strain into which the mutation of the target gene was introduced was selected. Whether or not to introduce the leuA gene mutation of the finally transformed strain was confirmed through nucleotide sequence analysis after PCR was performed using the primers of SEQ ID NO: 9 and SEQ ID NO: 15 under the following conditions: 94° C. for 5 min, then 30 cycles of 94° C. 30 sec/55° C. for 30 sec/72° C. for 90 sec, followed by 72° C. for 5 min. As a result of nucleotide sequence analysis, a leuA mutation encoding a LeuA variant (P247C, R558H, G561D) in which arginine, which is the 558th amino acid of the LeuA protein, is substituted with histidine, glycine, which is the 561th amino acid, is substituted with aspartic acid, and proline (Pro), which is the 247th amino acid was substituted with cysteine (Cys), by substituting G, which is the 1673th nucleotide of the leuA gene with A; GC, which is the 1682th and 1683th nucleotides, with AT; and CC, which is the 739th and 740th nucleotides with TG in the strain chromosome, was introduced into the strain. The produced CJL8100_leuA_P247C was named 'CA13-8105', and was deposited to the Korean Culture Center of Microorganisms (KCCM), which is an international depositary authority under the Budapest Treaty, on Apr. 29, 2020, under the given deposit number Amino acid sequence of LeuA variant (P247C, R558H, G561D) comprising the three mutations and the nucleotide sequence of the leuA variant encoding the same are the same as SEQ ID NO: 5 and SEQ ID NO: 6, respectively.

ATCC13032, the produced CJL-8100, and CA13-8105 strains were evaluated for the L-leucine producing ability. Specifically, flask culture was performed in the same manner as in Example 2-2, and after completion of the culture, the L-leucine production amount of the parent strain and the mutant strain was measured by HPLC, and the results are shown in Table 8 below.

TABLE 8

| Strain name | L-leucine (g/L) |
|---|---|
| ATCC13032 | 0.87 |
| ATCC13032_leuA_(R558H, G561D): CJL-8100 | 2.71 |
| CJL8100_leuA_P247C: CA13-8105 | 3.52 |

As shown in Table 8, the L-leucine-producing strain, *Corynebacterium glutamicum* CJL8100 improved an L-leucine producing ability by about 130% as compared with the parent strain ATCC13032. CA13-8105 strain, which additionally introduced the leuA_P247C mutation in CJL8100 strain, improved L-leucine producing ability by about 150% as compared with the parent strain CJL8100. Through the above results, it can be confirmed that the amino acid at position 247 in the amino acid sequence of the LeuA protein is an important position for L-leucine production activity.

Example 4-4. Measurement of Isopropylmalate Synthase Activity in the Strain Introduced with LeuA Variant In order to measure the activity of isopropylmalate synthase in CJL-8100 and CA13-8105, which are L-leucine producing strains produced in Example 4-3, the experiment was performed by the following method.

The strains (CJL-8100, CA13-8105) and wild type ATCC13032 were respectively inoculated into a 250 ml corner-baffled flask containing 25 ml of each seed medium (production medium in Table 2) using a platinum loop, and then was subjected to shaking culture at 30° C. with a shaking rate of 200 rpm for 16 hours. After completion of the culture, the culture solution was centrifuged, the supernatant was discarded, and the pellet was suspended and washed with a lysis buffer solution, and the cells were disrupted with a bead homogenizer. The protein quantification in the lysate is based on Bradford assay method, and a lysate containing 100 μg/ml of protein was used. The activity of the isopropylmalate synthase enzyme was measured by measuring the change in absorption at 412 nm due to thionitrobenzoate (TNB) formed from DTNB (5,5'-dithiobis-(2-nitrobenzoic acid), Ellman's reagent) by reduction using the produced CoA, at this time.

The results of measuring the activity of isopropylmalate synthase in each strain are shown in Table 9 below.

TABLE 9

| Strain | Relative isopropyl-malatesynthase activity (%) |
|---|---|
| ATCC13032 | 100 |
| ATCC13032_leuA_(R558H, G561D): CJL-8100 | 113 |
| CJL8100_leuA_P247C: CA13-8105 | 121 |

Next, in order to confirm the degree of release of the feedback inhibition of the above enzyme to leucine, the CoA produced when using a solution containing 100 μg/m2 of protein was measured under the condition to which 2 g/l of leucine was added, thereby measuring the activity of isopropylmalate synthase. The results of measuring the activity of isopropylmalate synthase in each strain are shown in Table 10 below.

TABLE 10

| Strain | Leucine 0 g/l Relative isopropylmalate Synthase activity (%) | Leucine 2 g/l |
|---|---|---|
| ATCC13032 | 100 | 36 |
| ATCC13032_leuA_(R558H, G561D): CJL-8100 | 100 | 78 |
| CJL8100_leuA_P247C: CA13-8105 | 100 | 88 |

As shown in Tables 9 and 10, it was confirmed that L-leucine-producing strains CJL-8100 and CA13-8105 transformed with LeuA mutant expression vector increased an isopropylmalate synthase activity by 1.13 times and 1.21 times, respectively, as compared with the control, *Corynebacterium glutamicum* ATCC 13032. In addition, it was confirmed that the L-leucine-producing strains maintained the isopropylmalate synthase enzyme activity at 78% and 88%, respectively, even under the condition to which 2 g/l of leucine was added, showing that the feedback inhibition by leucine was released.

From the foregoing, a skilled person in the art to which the present invention pertains will be able to understand that the present invention may be embodied in other specific forms without modifying the technical concepts or essential characteristics of the present invention. In this regard, the exemplary embodiments disclosed herein are only for illustrative purposes and should not be construed as limiting the scope of the present invention. On the contrary, the present invention is intended to cover not only the exemplary embodiments but also various alternatives, modifications, equivalents, and other embodiments that may be comprised within the spirit and scope of the present invention as defined by the appended claims.

The invention claimed is:

1. A mutated polypeptide with isopropylmalate synthase activity, comprising an amino acid sequence at least 90% identical to amino acid residues 36-616 of SEQ ID NO: 1 that is a wild-type sequence, wherein the mutated polypeptide has an amino acid residue other than proline at a position corresponding to position 247 in the amino acid sequence of SEQ ID NO: 1 and wherein the amino acid residues 36-616 are set forth in SEQ ID NO: 16.

2. The mutated polypeptide of claim 1, wherein the position corresponding to position 247 in the amino acid sequence of SEQ ID NO: 1 is substituted with cysteine.

3. The mutated polypeptide of claim 1, wherein the mutated polypeptide comprises the amino acid sequence of SEQ ID NO: 3.

4. The mutated polypeptide of claim 1, wherein the mutated polypeptide has an amino acid residue other than arginine at a position corresponding to position 558 in the amino acid sequence of SEQ ID NO: 1.

5. The mutated polypeptide of claim 4, wherein the mutated polypeptide comprises the amino acid sequence of SEQ ID NO: 5.

6. The mutated polypeptide of claim 1, wherein the mutated polypeptide has an amino acid residue other than a glycine at a position corresponding to position 561 in the amino acid sequence of SEQ ID NO: 1.

7. The mutated polypeptide of claim 1, wherein the mutated polypeptide has
an amino acid residue other than an arginine at a position corresponding to position 558 in the amino acid sequence of SEQ ID NO: 1, and
an amino acid residue other than a glycine at a position corresponding to position 561 in the amino acid sequence of SEQ ID NO: 1.

8. The mutated polypeptide of claim 1, wherein the mutated polypeptide has histidine at a position corresponding to position 558 in the amino acid sequence of SEQ ID NO: 1.

9. The mutated polypeptide of claim 1, wherein the mutated polypeptide has aspartic acid at a position corresponding to position 561 in the amino acid sequence of SEQ ID NO: 1.

10. The mutated polypeptide of claim 1, wherein the mutated polypeptide has
histidine at a position corresponding to position 558 in the amino acid sequence of SEQ ID NO: 1; and
aspartic acid at a position corresponding to position 561 in the amino acid sequence of SEQ ID NO: 1.

11. The mutated polypeptide of claim 1, comprising an amino acid sequence at least 98% identical to the amino acid sequence of SEQ ID NO: 16.

12. The mutated polypeptide of claim 1, comprising an amino acid sequence at least 95% identical to the amino acid sequence of SEQ ID NO:1.

13. The mutated polypeptide of claim 1, comprising an amino acid sequence at least 99% identical to the amino acid sequence of SEQ ID NO: 1.

* * * * *

SEQUENCE LISTING

```
<160> NUMBER OF SEQ ID NOS: 16

<210> SEQ ID NO 1
<211> LENGTH: 616
<212> TYPE: PRT
<213> ORGANISM: Artificial Sequence
<220> FEATURE:
<223> OTHER INFORMATION: synthetic_LeuA AA (616 aa)

<400> SEQUENCE: 1

Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
```

-continued

```
                20                  25                  30
Gly Ser Ser Met Pro Val Asn Arg Tyr Met Pro Phe Glu Val Glu Val
            35                  40                  45
Glu Asp Ile Ser Leu Pro Asp Arg Thr Trp Pro Asp Lys Lys Ile Thr
 50                  55                  60
Val Ala Pro Gln Trp Cys Ala Val Asp Leu Arg Asp Gly Asn Gln Ala
 65                  70                  75                  80
Leu Ile Asp Pro Met Ser Pro Glu Arg Lys Arg Met Phe Glu Leu
             85                  90                  95
Leu Val Gln Met Gly Phe Lys Glu Ile Glu Val Gly Phe Pro Ser Ala
            100                 105                 110
Ser Gln Thr Asp Phe Asp Phe Val Arg Glu Ile Ile Glu Lys Gly Met
            115                 120                 125
Ile Pro Asp Asp Val Thr Ile Gln Val Leu Val Gln Ala Arg Glu His
            130                 135                 140
Leu Ile Arg Arg Thr Phe Glu Ala Cys Glu Gly Ala Lys Asn Val Ile
145                 150                 155                 160
Val His Phe Tyr Asn Ser Thr Ser Ile Leu Gln Arg Asn Val Val Phe
            165                 170                 175
Arg Met Asp Lys Val Gln Val Lys Lys Leu Ala Thr Asp Ala Ala Glu
            180                 185                 190
Leu Ile Lys Thr Ile Ala Gln Asp Tyr Pro Asp Thr Asn Trp Arg Trp
            195                 200                 205
Gln Tyr Ser Pro Glu Ser Phe Thr Gly Thr Glu Val Glu Tyr Ala Lys
            210                 215                 220
Glu Val Val Asp Ala Val Val Glu Val Met Asp Pro Thr Pro Glu Asn
225                 230                 235                 240
Pro Met Ile Ile Asn Leu Pro Ser Thr Val Glu Met Ile Thr Pro Asn
            245                 250                 255
Val Tyr Ala Asp Ser Ile Glu Trp Met His Arg Asn Leu Asn Arg Arg
            260                 265                 270
Asp Ser Ile Ile Leu Ser Leu His Pro His Asn Asp Arg Gly Thr Gly
            275                 280                 285
Val Gly Ala Ala Glu Leu Gly Tyr Met Ala Gly Ala Asp Arg Ile Glu
            290                 295                 300
Gly Cys Leu Phe Gly Asn Gly Glu Arg Thr Gly Asn Val Cys Leu Val
305                 310                 315                 320
Thr Leu Ala Leu Asn Met Leu Thr Gln Gly Val Asp Pro Gln Leu Asp
            325                 330                 335
Phe Thr Asp Ile Arg Gln Ile Arg Ser Thr Val Glu Tyr Cys Asn Gln
            340                 345                 350
Leu Arg Val Pro Glu Arg His Pro Tyr Gly Gly Asp Leu Val Phe Thr
            355                 360                 365
Ala Phe Ser Gly Ser His Gln Asp Ala Val Asn Lys Gly Leu Asp Ala
            370                 375                 380
Met Ala Ala Lys Val Gln Pro Gly Ala Ser Ser Thr Glu Val Ser Trp
385                 390                 395                 400
Glu Gln Leu Arg Asp Thr Glu Trp Glu Val Pro Tyr Leu Pro Ile Asp
            405                 410                 415
Pro Lys Asp Val Gly Arg Asp Tyr Glu Ala Val Ile Arg Val Asn Ser
            420                 425                 430
Gln Ser Gly Lys Gly Gly Val Ala Tyr Ile Met Lys Thr Asp His Gly
            435                 440                 445
```

```
Leu Gln Ile Pro Arg Ser Met Gln Val Glu Phe Ser Thr Val Val Gln
    450                 455                 460

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
                485                 490                 495

Ile Ala Leu Arg Val Glu Asn Ala Gln Thr Glu Asn Glu Asp Ala Ser
                500                 505                 510

Ile Thr Ala Glu Leu Ile His Asn Gly Lys Asp Val Thr Val Asp Gly
            515                 520                 525

Arg Gly Asn Gly Pro Leu Ala Ala Tyr Ala Asn Ala Leu Glu Lys Leu
    530                 535                 540

Gly Ile Asp Val Glu Ile Gln Glu Tyr Asn Gln His Ala Arg Thr Ser
545                 550                 555                 560

Gly Asp Asp Ala Glu Ala Ala Tyr Val Leu Ala Glu Val Asn Gly
                565                 570                 575

Arg Lys Val Trp Gly Val Gly Ile Ala Gly Ser Ile Thr Tyr Ala Ser
            580                 585                 590

Leu Lys Ala Val Thr Ser Ala Val Asn Arg Ala Leu Asp Val Asn His
    595                 600                 605

Glu Ala Val Leu Ala Gly Gly Val
    610                 615

<210> SEQ ID NO 2
<211> LENGTH: 1851
<212> TYPE: DNA
<213> ORGANISM: Artificial Sequence
<220> FEATURE:
<223> OTHER INFORMATION: synthetic_leuA NT

<400> SEQUENCE: 2
atgtctccta cgatgcatt catctccgca cctgccaaga tcgaaacccc agttgggcct       60
cgcaacgaag gccagccagc atggaataag cagcgtggct cctcaatgcc agttaaccgc      120
tacatgcctt tcgaggttga ggtagaagat atttctctgc cggaccgcac ttggccagat      180
aaaaaaatca ccgttgcacc tcagtggtgt gctgttgacc tgcgtgacgg caaccaggct      240
ctgattgatc cgatgtctcc tgagcgtaag cgccgcatgt ttgagctgct ggttcagatg      300
ggcttcaaag aaatcgaggt cggtttccct tcagcttccc agactgattt tgatttcgtt      360
cgtgagatca tcgaaaaggg catgatccct gacgatgtca ccattcaggt tctggttcag      420
gctcgtgagc acctgattcg ccgtactttt gaagcttgcg aaggcgcaaa aaacgttatc      480
gtgcacttct acaactccac ctccatcctg cagcgcaacg tggtgttccg catggacaag      540
gtgcaggtga agaagctggc taccgatgcc gctgaactaa tcaagaccat cgctcaggat      600
tacccagaca ccaactggcg ctggcagtac tcccctgagt ccttcaccgg cactgaggtt      660
gagtacgcca aggaagttgt ggacgcagtt gttgaggtca tggatccaac tcctgagaac      720
ccaatgatca tcaacctgcc ttccaccgtt gagatgatca cccctaacgt ttacgcagac      780
tccattgaat ggatgcaccg caatctaaac cgtcgtgatt ccattatcct gtccctgcac      840
ccgcacaatg accgtggcac cggcgttggc gcagctgagc tgggctacat ggctggcgct      900
gaccgcatcg aaggctgcct gttcggcaac ggcgagcgca ccggcaacgt ctgcctggtc      960
accctggcac tgaacatgct gacccagggc gttgaccctc agctggactt caccgatata     1020
cgccagatcc gcagcaccgt tgaatactgc aaccagctgc gcgttcctga cgccacccca     1080
```

```
tacggcggtg acctggtctt caccgctttc tccggttccc accaggacgc tgtgaacaag    1140
ggtctggacg ccatggctgc caaggttcag ccaggtgcta gctccactga agtttcttgg    1200
gagcagctgc gcgacaccga atgggaggtt ccttacctgc ctatcgatcc aaaggatgtc    1260
ggtcgcgact acgaggctgt tatccgcgtg aactcccagt ccggcaaggg cggcgttgct    1320
tacatcatga agaccgatca cggtctgcag atccctcgct ccatgcaggt tgagttctcc    1380
accgttgtcc agaacgtcac cgacgctgag ggcggcgagg tcaactccaa ggcaatgtgg    1440
gatatcttcg ccaccgagta cctggagcgc accgcaccag ttgagcagat cgcgctgcgc    1500
gtcgagaacg ctcagaccga aaacgaggat gcatccatca ccgccgagct catccacaac    1560
ggcaaggacg tcaccgtcga tggccgcggc aacggcccac tggccgctta cgccaacgcg    1620
ctggagaagc tgggcatcga cgttgagatc caggaataca accagcacgc ccgcacctcg    1680
ggcgacgatg cagaagcagc cgcctacgtg ctggctgagg tcaacggccg caaggtctgg    1740
ggcgtcggca tcgctggctc catcacctac gcttcgctga aggcagtgac ctccgccgta    1800
aaccgcgcgc tggacgtcaa ccacgaggca gtcctggctg gcggcgttta a             1851
```

<210> SEQ ID NO 3
<211> LENGTH: 616
<212> TYPE: PRT
<213> ORGANISM: Artificial Sequence
<220> FEATURE:
<223> OTHER INFORMATION: synthetic_LeuA P247C AA (616 aa)

<400> SEQUENCE: 3

```
Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
    50                  55                  60

Val Ala Pro Gln Trp Cys Ala Val Asp Leu Arg Asp Gly Asn Gln Ala
65                  70                  75                  80

Leu Ile Asp Pro Met Ser Pro Glu Arg Lys Arg Arg Met Phe Glu Leu
                85                  90                  95

Leu Val Gln Met Gly Phe Lys Glu Ile Glu Val Gly Phe Pro Ser Ala
            100                 105                 110

Ser Gln Thr Asp Phe Asp Phe Val Arg Glu Ile Ile Glu Lys Gly Met
        115                 120                 125

Ile Pro Asp Asp Val Thr Ile Gln Val Leu Val Gln Ala Arg Glu His
    130                 135                 140

Leu Ile Arg Arg Thr Phe Glu Ala Cys Glu Gly Ala Lys Asn Val Ile
145                 150                 155                 160

Val His Phe Tyr Asn Ser Thr Ser Ile Leu Gln Arg Asn Val Val Phe
                165                 170                 175

Arg Met Asp Lys Val Gln Val Lys Lys Leu Ala Thr Asp Ala Ala Glu
            180                 185                 190

Leu Ile Lys Thr Ile Ala Gln Asp Tyr Pro Asp Thr Asn Trp Arg Trp
        195                 200                 205

Gln Tyr Ser Pro Glu Ser Phe Thr Gly Thr Glu Val Glu Tyr Ala Lys
    210                 215                 220
```

Glu Val Val Asp Ala Val Glu Val Met Asp Pro Thr Pro Glu Asn
225                 230                 235                 240

Pro Met Ile Ile Asn Leu Cys Ser Thr Val Glu Met Ile Thr Pro Asn
            245                 250                 255

Val Tyr Ala Asp Ser Ile Glu Trp Met His Arg Asn Leu Asn Arg Arg
        260                 265                 270

Asp Ser Ile Ile Leu Ser Leu His Pro His Asn Asp Arg Gly Thr Gly
    275                 280                 285

Val Gly Ala Ala Glu Leu Gly Tyr Met Ala Gly Ala Asp Arg Ile Glu
290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
            325                 330                 335

Phe Thr Asp Ile Arg Gln Ile Arg Ser Thr Val Glu Tyr Cys Asn Gln
        340                 345                 350

Leu Arg Val Pro Glu Arg His Pro Tyr Gly Gly Asp Leu Val Phe Thr
    355                 360                 365

Ala Phe Ser Gly Ser His Gln Asp Ala Val Asn Lys Gly Leu Asp Ala
370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
            405                 410                 415

Pro Lys Asp Val Gly Arg Asp Tyr Glu Ala Val Ile Arg Val Asn Ser
        420                 425                 430

Gln Ser Gly Lys Gly Val Ala Tyr Ile Met Lys Thr Asp His Gly
    435                 440                 445

Leu Gln Ile Pro Arg Ser Met Gln Val Glu Phe Ser Thr Val Val Gln
450                 455                 460

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
            485                 490                 495

Ile Ala Leu Arg Val Glu Asn Ala Gln Thr Glu Asn Glu Asp Ala Ser
        500                 505                 510

Ile Thr Ala Glu Leu Ile His Asn Gly Lys Asp Val Thr Val Asp Gly
    515                 520                 525

Arg Gly Asn Gly Pro Leu Ala Ala Tyr Ala Asn Ala Leu Glu Lys Leu
530                 535                 540

Gly Ile Asp Val Glu Ile Gln Glu Tyr Asn Gln His Ala Arg Thr Ser
545                 550                 555                 560

Gly Asp Asp Ala Glu Ala Ala Tyr Val Leu Ala Glu Val Asn Gly
            565                 570                 575

Arg Lys Val Trp Gly Val Gly Ile Ala Gly Ser Ile Thr Tyr Ala Ser
        580                 585                 590

Leu Lys Ala Val Thr Ser Ala Val Asn Arg Ala Leu Asp Val Asn His
    595                 600                 605

Glu Ala Val Leu Ala Gly Gly Val
    610                 615

<210> SEQ ID NO 4
<211> LENGTH: 1851
<212> TYPE: DNA

<213> ORGANISM: Artificial Sequence
<220> FEATURE:
<223> OTHER INFORMATION: synthetic_LeuA P247C NT

<400> SEQUENCE: 4

```
atgtctccta cgatgcatt catctccgca cctgccaaga tcgaaacccc agttgggcct    60
cgcaacgaag gccagccagc atggaataag cagcgtggct cctcaatgcc agttaaccgc   120
tacatgcctt cgaggttga ggtagaagat atttctctgc cggaccgcac ttggccagat   180
aaaaaaatca ccgttgcacc tcagtggtgt gctgttgacc tgcgtgacgg caaccaggct   240
ctgattgatc cgatgtctcc tgagcgtaag cgccgcatgt ttgagctgct ggttcagatg   300
ggcttcaaag aaatcgaggt cggttttcct tcagcttccc agactgattt tgatttcgtt   360
cgtgagatca tcgaaaaggg catgatccct gacgatgtca ccattcaggt tctggttcag   420
gctcgtgagc acctgattcg ccgtactttt gaagcttgcg aaggcgcaaa aaacgttatc   480
gtgcacttct acaactccac ctccatcctg cagcgcaacg tggtgttccg catggacaag   540
gtgcaggtga agaagctggc taccgatgcc gctgaactaa tcaagaccat cgctcaggat   600
tacccagaca ccaactggcg ctggcagtac tcccctgagt ccttcaccgg cactgaggtt   660
gagtacgcca aggaagttgt ggacgcagtt gttgaggtca tggatccaac tcctgagaac   720
ccaatgatca tcaacctgtg ttccaccgtt gagatgatca cccctaacgt ttacgcagac   780
tccattgaat ggatgcaccg caatctaaac cgtcgtgatt ccattatcct gtccctgcac   840
ccgcacaatg accgtggcac cggcgttggc gcagctgagc tgggctacat ggctggcgct   900
gaccgcatcg aaggctgcct gttcggcaac ggcgagcgca ccggcaacgt ctgcctggtc   960
accctggcac tgaacatgct gacccagggc gttgaccctc agctggactt caccgatata  1020
cgccagatcc gcagcaccgt tgaatactgc aaccagctgc gcgttcctga gcgccaccca  1080
tacggcggtg acctggtctt caccgctttc tccggttccc accaggacgc tgtgaacaag  1140
ggtctggacg ccatggctgc caaggttcag ccaggtgcta gctccactga gtttcttgg   1200
gagcagctgc gcgacaccga atgggaggtt ccttacctgc ctatcgatcc aaaggatgtc  1260
ggtcgcgact acgaggctgt tatccgcgtg aactcccagt ccggcaaggg cggcgttgct  1320
tacatcatga agaccgatca cggtctgcag atccctcgct ccatgcaggt tgagttctcc  1380
accgttgtcc agaacgtcac cgacgctgag ggcggcgagg tcaactccaa ggcaatgtgg  1440
gatatcttcg ccaccgagta cctggagcgc accgcaccag ttgagcagat cgcgctgcgc  1500
gtcgagaacg ctcagaccga aaacgaggat gcatccatca ccgccgagct catccacaac  1560
ggcaaggacg tcaccgtcga tggccgcggc aacggcccac tggccgctta cgccaacgcg  1620
ctggagaagc tgggcatcga cgttgagatc caggaataca accagcacgc ccgcaccctcg 1680
ggcgacgatg cagaagcagc cgcctacgtg ctggctgagg tcaacggccg caaggtctgg  1740
ggcgtcggca tcgctggctc catcacctac gcttcgctga aggcagtgac ctccgccgta  1800
aaccgcgcgc tggacgtcaa ccacgaggca gtcctggctg gcggcgttta a           1851
```

<210> SEQ ID NO 5
<211> LENGTH: 616
<212> TYPE: PRT
<213> ORGANISM: Artificial Sequence
<220> FEATURE:
<223> OTHER INFORMATION: synthetic_LeuA P247C R558H G561D AA (616 aa)

<400> SEQUENCE: 5

Met Ser Pro Asn Asp Ala Phe Ile Ser Ala Pro Ala Lys Ile Glu Thr

-continued

```
1               5                   10                  15
Pro Val Gly Pro Arg Asn Glu Gly Gln Pro Ala Trp Asn Lys Gln Arg
                20                  25                  30
Gly Ser Ser Met Pro Val Asn Arg Tyr Met Pro Phe Glu Val Glu Val
                35                  40                  45
Glu Asp Ile Ser Leu Pro Asp Arg Thr Trp Pro Asp Lys Lys Ile Thr
             50                  55                  60
Val Ala Pro Gln Trp Cys Ala Val Asp Leu Arg Asp Gly Asn Gln Ala
 65                 70                  75                  80
Leu Ile Asp Pro Met Ser Pro Glu Arg Lys Arg Met Phe Glu Leu
                     85                  90                  95
Leu Val Gln Met Gly Phe Lys Glu Ile Glu Val Gly Phe Pro Ser Ala
                100                 105                 110
Ser Gln Thr Asp Phe Asp Phe Val Arg Glu Ile Ile Glu Lys Gly Met
                115                 120                 125
Ile Pro Asp Asp Val Thr Ile Gln Val Leu Val Gln Ala Arg Glu His
                130                 135                 140
Leu Ile Arg Arg Thr Phe Glu Ala Cys Glu Gly Ala Lys Asn Val Ile
145                 150                 155                 160
Val His Phe Tyr Asn Ser Thr Ser Ile Leu Gln Arg Asn Val Val Phe
                165                 170                 175
Arg Met Asp Lys Val Gln Val Lys Lys Leu Ala Thr Asp Ala Ala Glu
                180                 185                 190
Leu Ile Lys Thr Ile Ala Gln Asp Tyr Pro Asp Thr Asn Trp Arg Trp
                195                 200                 205
Gln Tyr Ser Pro Glu Ser Phe Thr Gly Thr Glu Val Glu Tyr Ala Lys
                210                 215                 220
Glu Val Val Asp Ala Val Val Glu Val Met Asp Pro Thr Pro Glu Asn
225                 230                 235                 240
Pro Met Ile Ile Asn Leu Cys Ser Thr Val Glu Met Ile Thr Pro Asn
                245                 250                 255
Val Tyr Ala Asp Ser Ile Glu Trp Met His Arg Asn Leu Asn Arg Arg
                260                 265                 270
Asp Ser Ile Ile Leu Ser Leu His Pro His Asn Asp Arg Gly Thr Gly
                275                 280                 285
Val Gly Ala Ala Glu Leu Gly Tyr Met Ala Gly Ala Asp Arg Ile Glu
                290                 295                 300
Gly Cys Leu Phe Gly Asn Gly Glu Arg Thr Gly Asn Val Cys Leu Val
305                 310                 315                 320
Thr Leu Ala Leu Asn Met Leu Thr Gln Gly Val Asp Pro Gln Leu Asp
                325                 330                 335
Phe Thr Asp Ile Arg Gln Ile Arg Ser Thr Val Glu Tyr Cys Asn Gln
                340                 345                 350
Leu Arg Val Pro Glu Arg His Pro Tyr Gly Gly Asp Leu Val Phe Thr
                355                 360                 365
Ala Phe Ser Gly Ser His Gln Asp Ala Val Asn Lys Gly Leu Asp Ala
                370                 375                 380
Met Ala Ala Lys Val Gln Pro Gly Ala Ser Ser Thr Glu Val Ser Trp
385                 390                 395                 400
Glu Gln Leu Arg Asp Thr Glu Trp Glu Val Pro Tyr Leu Pro Ile Asp
                405                 410                 415
Pro Lys Asp Val Gly Arg Asp Tyr Glu Ala Val Ile Arg Val Asn Ser
                420                 425                 430
```

Gln Ser Gly Lys Gly Val Ala Tyr Ile Met Lys Thr Asp His Gly
        435                 440                 445

Leu Gln Ile Pro Arg Ser Met Gln Val Glu Phe Ser Thr Val Val Gln
    450                 455                 460

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
                485                 490                 495

Ile Ala Leu Arg Val Glu Asn Ala Gln Thr Glu Asn Glu Asp Ala Ser
                500                 505                 510

Ile Thr Ala Glu Leu Ile His Asn Gly Lys Asp Val Thr Val Asp Gly
            515                 520                 525

Arg Gly Asn Gly Pro Leu Ala Ala Tyr Ala Asn Ala Leu Glu Lys Leu
        530                 535                 540

Gly Ile Asp Val Glu Ile Gln Glu Tyr Asn Gln His Ala His Thr Ser
545                 550                 555                 560

Asp Asp Asp Ala Glu Ala Ala Tyr Val Leu Ala Glu Val Asn Gly
                565                 570                 575

Arg Lys Val Trp Gly Val Gly Ile Ala Gly Ser Ile Thr Tyr Ala Ser
            580                 585                 590

Leu Lys Ala Val Thr Ser Ala Val Asn Arg Ala Leu Asp Val Asn His
        595                 600                 605

Glu Ala Val Leu Ala Gly Gly Val
    610                 615

<210> SEQ ID NO 6
<211> LENGTH: 1851
<212> TYPE: DNA
<213> ORGANISM: Artificial Sequence
<220> FEATURE:
<223> OTHER INFORMATION: synthetic_LeuA P247C R558H G561D NT

<400> SEQUENCE: 6

```
atgtctccta acgatgcatt catctccgca cctgccaaga tcgaaacccc agttgggcct      60
cgcaacgaag gccagccagc atggaataag cagcgtggct cctcaatgcc agttaaccgc     120
tacatgcctt cgaggttgag gtagaagat atttctctgc cggaccgcac ttggccagat      180
aaaaaaatca ccgttgcacc tcagtggtgt gctgttgacc tgcgtgacgg caaccaggct     240
ctgattgatc cgatgtctcc tgagcgtaag cgccgcatgt tgagctgct ggttcagatg      300 ggcttcaaag aaatcgaggt cggtttccct tcagcttccc agactgattt tgatttcgtt     360
cgtgagatca tcgaaaaggg catgatccct gacgatgtca ccattcaggt tctggttcag     420
gctcgtgagc acctgattcg ccgtacttt gaagcttgcg aaggcgcaaa aaacgttatc      480
gtgcacttct acaactccac ctccatcctg cagcgcaacg tggtgttccg catggacaag     540
gtgcaggtga agaagctggc taccgatgcc gctgaactaa tcaagaccat cgctcaggat     600
tacccagaca ccaactggcg ctggcagtac tcccctgagt ccttcaccgg cactgaggtt     660
gagtacgcca aggaagttgt ggacgcagtt gttgaggtca tggatccaac tcctgagaac     720
ccaatgatca tcaacctgtg ttccaccgtt gagatgatca cccctaacgt ttacgcagac     780
tccattgaat ggatgcaccg caatctaaac cgtcgtgatt ccattatcct gtccctgcac     840
ccgcacaatg accgtggcac cggcgttggc gcagctgagc tggctacat ggctggcgct     900 gaccgcatcg aaggctgcct gttcggcaac ggcgagcgca ccggcaacgt ctgcctggtc     960
```

```
acctctggcac tgaacatgct gacccagggc gttgaccctc agctggactt caccgatata   1020
cgccagatcc gcagcaccgt tgaatactgc aaccagctgc gcgttcctga gcgccaccca   1080
tacggcggtg acctggtctt caccgctttc tccggttccc accaggacgc tgtgaacaag   1140
ggtctggacg ccatggctgc caaggttcag ccaggtgcta gctccactga agtttcttgg   1200
gagcagctgc gcgacaccga atgggaggtt ccttacctgc ctatcgatcc aaaggatgtc   1260
ggtcgcgact acgaggctgt tatccgcgtg aactcccagt ccggcaaggg cggcgttgct   1320
tacatcatga agaccgatca cggtctgcag atccctcgct ccatgcaggt tgagttctcc   1380
accgttgtcc agaacgtcac cgacgctgag ggcggcgagg tcaactccaa ggcaatgtgg   1440
gatatcttcg ccaccgagta cctggagcgc accgcaccag ttgagcagat cgcgctgcgc   1500
gtcgagaacg ctcagaccga aaacgaggat gcatccatca ccgccgagct catccacaac   1560
ggcaaggacg tcaccgtcga tggccgcggc aacggcccac tggccgctta cgccaacgcg   1620
ctggagaagc tgggcatcga cgttgagatc caggaataca accagcacgc ccacacctcg   1680
gatgacgatg cagaagcagc cgcctacgtg ctggctgagg tcaacggccg caaggtctgg   1740
ggcgtcggca tcgctggctc catcacctac gcttcgctga aggcagtgac ctccgccgta   1800
aaccgcgcgc tggacgtcaa ccacgaggca gtcctggctg cggcgtttta a           1851

<210> SEQ ID NO 7
<211> LENGTH: 30
<212> TYPE: DNA
<213> ORGANISM: Artificial Sequence
<220> FEATURE:
<223> OTHER INFORMATION: synthetic_pCR-leuA_F

<400> SEQUENCE: 7
ctaatctcga ggtcacccat gtctcctaac                                       30

<210> SEQ ID NO 8
<211> LENGTH: 27
<212> TYPE: DNA
<213> ORGANISM: Artificial Sequence
<220> FEATURE:
<223> OTHER INFORMATION: synthetic_pCR-leuA_R

<400> SEQUENCE: 8
ggctggcggc gttttaaaacc ggttgat                                         27

<210> SEQ ID NO 9
<211> LENGTH: 22
<212> TYPE: DNA
<213> ORGANISM: Artificial Sequence
<220> FEATURE:
<223> OTHER INFORMATION: synthetic_leuA_sequencing_F

<400> SEQUENCE: 9
aacacgaccg gcatcccgtc gc                                               22

<210> SEQ ID NO 10
<211> LENGTH: 23
<212> TYPE: DNA
<213> ORGANISM: Artificial Sequence
<220> FEATURE:
<223> OTHER INFORMATION: synthetic_leuA_sequencing_R

<400> SEQUENCE: 10
aaatcatttg agaaaactcg agg                                              23
```

```
<210> SEQ ID NO 11
<211> LENGTH: 45
<212> TYPE: DNA
<213> ORGANISM: Artificial Sequence
<220> FEATURE:
<223> OTHER INFORMATION: synthetic_leuA_P247C_Up_F

<400> SEQUENCE: 11
gtgaattcga gctcggtacc caaatcattt gagaaaactc gaggc            45

<210> SEQ ID NO 12
<211> LENGTH: 45
<212> TYPE: DNA
<213> ORGANISM: Artificial Sequence
<220> FEATURE:
<223> OTHER INFORMATION: synthetic_leuA_P247C_Up_R

<400> SEQUENCE: 12
ggtgatcatc tcaacggtgg aacacaggtt gatgatcatt gggtt            45

<210> SEQ ID NO 13
<211> LENGTH: 45
<212> TYPE: DNA
<213> ORGANISM: Artificial Sequence
<220> FEATURE:
<223> OTHER INFORMATION: synthetic_leuA_P247C_Down_F

<400> SEQUENCE: 13
aacccaatga tcatcaacct gtgttccacc gttgagatga tcacc            45

<210> SEQ ID NO 14
<211> LENGTH: 42
<212> TYPE: DNA
<213> ORGANISM: Artificial Sequence
<220> FEATURE:
<223> OTHER INFORMATION: synthetic_leuA_P247C_Down_R

<400> SEQUENCE: 14
ggtcgactct agaggatccc caagaaggca acatcggaca gc               42

<210> SEQ ID NO 15
<211> LENGTH: 21
<212> TYPE: DNA
<213> ORGANISM: Artificial Sequence
<220> FEATURE:
<223> OTHER INFORMATION: synthetic_leuA_sequencing_R

<400> SEQUENCE: 15
atccattcaa tggagtctgc g                                      21

<210> SEQ ID NO 16
<211> LENGTH: 581
<212> TYPE: PRT
<213> ORGANISM: Artificial Sequence
<220> FEATURE:
<223> OTHER INFORMATION: synthetic_LeuA AA (581 aa)

<400> SEQUENCE: 16

Met Pro Val Asn Arg Tyr Met Pro Phe Glu Val Glu Val Glu Asp Ile
1               5                  10                  15

Ser Leu Pro Asp Arg Thr Trp Pro Asp Lys Lys Ile Thr Val Ala Pro
            20                  25                  30

Gln Trp Cys Ala Val Asp Leu Arg Asp Gly Asn Gln Ala Leu Ile Asp
        35                  40                  45

Pro Met Ser Pro Glu Arg Lys Arg Arg Met Phe Glu Leu Leu Val Gln
```

```
            50                  55                  60
Met Gly Phe Lys Glu Ile Glu Val Gly Phe Pro Ser Ala Ser Gln Thr
 65                  70                  75                  80

Asp Phe Asp Phe Val Arg Glu Ile Ile Glu Lys Gly Met Ile Pro Asp
                     85                  90                  95

Asp Val Thr Ile Gln Val Leu Val Gln Ala Arg Glu His Leu Ile Arg
                100                 105                 110

Arg Thr Phe Glu Ala Cys Glu Gly Ala Lys Asn Val Ile Val His Phe
                115                 120                 125

Tyr Asn Ser Thr Ser Ile Leu Gln Arg Asn Val Val Phe Arg Met Asp
            130                 135                 140

Lys Val Gln Val Lys Lys Leu Ala Thr Asp Ala Ala Glu Leu Ile Lys
145                 150                 155                 160

Thr Ile Ala Gln Asp Tyr Pro Asp Thr Asn Trp Arg Trp Gln Tyr Ser
                165                 170                 175

Pro Glu Ser Phe Thr Gly Thr Glu Val Glu Tyr Ala Lys Glu Val Val
                180                 185                 190

Asp Ala Val Val Glu Val Met Asp Pro Thr Pro Glu Asn Pro Met Ile
                195                 200                 205

Ile Asn Leu Pro Ser Thr Val Glu Met Ile Thr Pro Asn Val Tyr Ala
            210                 215                 220

Asp Ser Ile Glu Trp Met His Arg Asn Leu Asn Arg Arg Asp Ser Ile
225                 230                 235                 240

Ile Leu Ser Leu His Pro His Asn Asp Arg Gly Thr Gly Val Gly Ala
                245                 250                 255

Ala Glu Leu Gly Tyr Met Ala Gly Ala Asp Arg Ile Glu Gly Cys Leu
                260                 265                 270

Phe Gly Asn Gly Glu Arg Thr Gly Asn Val Cys Leu Val Thr Leu Ala
            275                 280                 285

Leu Asn Met Leu Thr Gln Gly Val Asp Pro Gln Leu Asp Phe Thr Asp
            290                 295                 300

Ile Arg Gln Ile Arg Ser Thr Val Glu Tyr Cys Asn Gln Leu Arg Val
305                 310                 315                 320

Pro Glu Arg His Pro Tyr Gly Gly Asp Leu Val Phe Thr Ala Phe Ser
                325                 330                 335

Gly Ser His Gln Asp Ala Val Asn Lys Gly Leu Asp Ala Met Ala Ala
                340                 345                 350

Lys Val Gln Pro Gly Ala Ser Ser Thr Glu Val Ser Trp Glu Gln Leu
            355                 360                 365

Arg Asp Thr Glu Trp Glu Val Pro Tyr Leu Pro Ile Asp Pro Lys Asp
            370                 375                 380

Val Gly Arg Asp Tyr Glu Ala Val Ile Arg Val Asn Ser Gln Ser Gly
385                 390                 395                 400

Lys Gly Val Ala Tyr Ile Met Lys Thr Asp His Gly Leu Gln Ile
            405                 410                 415

Pro Arg Ser Met Gln Val Glu Phe Ser Thr Val Val Gln Asn Val Thr
            420                 425                 430

Asp Ala Glu Gly Gly Glu Val Asn Ser Lys Ala Met Trp Asp Ile Phe
            435                 440                 445

Ala Thr Glu Tyr Leu Glu Arg Thr Ala Pro Val Glu Gln Ile Ala Leu
            450                 455                 460

Arg Val Glu Asn Ala Gln Thr Glu Asn Glu Asp Ala Ser Ile Thr Ala
465                 470                 475                 480
```

```
Glu Leu Ile His Asn Gly Lys Asp Val Thr Val Asp Gly Arg Gly Asn
            485             490             495

Gly Pro Leu Ala Ala Tyr Ala Asn Ala Leu Glu Lys Leu Gly Ile Asp
            500             505             510

Val Glu Ile Gln Glu Tyr Asn Gln His Ala Arg Thr Ser Gly Asp Asp
        515             520             525

Ala Glu Ala Ala Tyr Val Leu Ala Glu Val Asn Gly Arg Lys Val
        530             535             540

Trp Gly Val Gly Ile Ala Gly Ser Ile Thr Tyr Ala Ser Leu Lys Ala
545             550             555             560

Val Thr Ser Ala Val Asn Arg Ala Leu Asp Val Asn His Glu Ala Val
            565             570             575

Leu Ala Gly Gly Val
            580
```